(12) United States Patent
Muharemovic et al.

(10) Patent No.: US 8,717,993 B2
(45) Date of Patent: *May 6, 2014

(54) ADAPTIVE SELECTION OF TRANSMISSION PARAMETERS FOR REFERENCE SIGNALS

(75) Inventors: Tarik Muharemovic, Dallas, TX (US); Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,405

(22) Filed: Dec. 8, 2011

(65) Prior Publication Data

US 2012/0113921 A1 May 10, 2012

Related U.S. Application Data

(63) Continuation of application No. 11/839,421, filed on Aug. 15, 2007, now Pat. No. 8,094,638.

(60) Provisional application No. 60/823,211, filed on Aug. 22, 2006.

(51) Int. Cl.
*H04W 72/04* (2009.01)

(52) U.S. Cl.
USPC ............ 370/329; 370/342; 370/328; 370/344

(58) Field of Classification Search
USPC ......... 370/329, 342, 328, 344, 208, 210, 349; 375/260, 267
See application file for complete search history.

(56) References Cited

U.S. PATENT DOCUMENTS

| | | | |
|---|---|---|---|
| 2004/0170157 A1* | 9/2004 | Kim et al. ..................... | 370/349 |
| 2005/0169165 A1 | 8/2005 | Cimini et al. | |
| 2005/0226140 A1 | 10/2005 | Zhuang et al. | |
| 2006/0018411 A1* | 1/2006 | Gore et al. ..................... | 375/340 |
| 2006/0050799 A1 | 3/2006 | Hou et al. | |
| 2007/0171995 A1 | 7/2007 | Muharemovic et al. | |
| 2007/0189404 A1* | 8/2007 | Baum et al. ................... | 375/260 |
| 2007/0195906 A1* | 8/2007 | Kim et al. ..................... | 375/267 |
| 2008/0123616 A1* | 5/2008 | Lee ............................... | 370/344 |

* cited by examiner

*Primary Examiner* — Rasheed Gidado
(74) *Attorney, Agent, or Firm* — Mirna Abyad; W. James Brady; Frederick J. Telecky, Jr.

(57) ABSTRACT

A method and apparatus for defining transmission parameters of user equipment reference signals. The method includes estimating channel delay spreads of a plurality of user equipments scheduled for transmission at a particular transmission time period or sub-frame in an uplink for communication with a NodeB, and allocating transmission parameters to each scheduled user equipment of the plurality of user equipments in accordance to the delay spreads of the plurality of user equipments scheduled for transmission in the particular time period or sub-frame, wherein the parameters comprises a cyclic shift allocated to each m-th user equipment equal to the sum of a delay spread and a timing uncertainty of each of the previous m-1 user equipments.

20 Claims, 5 Drawing Sheets

ADAPTIVE SELECTION OF TRANSMISSION PARAMETERS FOR REFERENCE SIGNALS

CLAIM OF PRIORITY

This application is a continuation to U.S. patent application Ser. No. 11/839,421, filed on Aug. 15, 2007, which claims priority to U.S. Patent Provisional Application No. 60/823,211, filed Aug. 22, 2006, which are incorporated by reference herein.

FIELD OF THE INVENTION

Embodiments of this invention generally relate to wireless communication and in particular to generation of reference signals sent by mobile users.

BACKGROUND OF THE INVENTION

The Global System for Mobile Communications (GSM: originally from Groupe Special Mobile) is currently the most popular standard for mobile phones in the world and is referred to as a 2G (second generation) system. Universal Mobile Telecommunications System (UMTS) is one of the third-generation (3G) mobile phone technologies. Currently, the most common form uses W-CDMA (Wideband Code Division Multiple Access) as the underlying air interface. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA (Time Division Multiple Access) signaling method of GSM networks.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of sub-carriers to individual users. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user. OFDMA is used in the mobility mode of IEEE 802.16 WirelessMAN Air Interface standard, commonly referred to as WiMAX. OFDMA is currently a working assumption in 3GPP Long Term Evolution (LTE) downlink. Also, OFDMA is the candidate access method for the IEEE 802.22 "Wireless Regional Area Networks".

NodeB is a term used in UMTS to denote the BTS (base transceiver station). In contrast with GSM base stations, NodeB uses WCDMA or OFDMA as air transport technology, depending on the type of network. As in all cellular systems, such as UMTS and GSM, NodeB contains radio frequency transmitter(s) and the receiver(s) used to communicate directly with the mobiles, which move freely around it. In this type of cellular networks the mobiles cannot communicate directly with each other but have to communicate with the BTSs Traditionally, the NodeBs have minimum functionality, and are controlled by an RNC (Radio Network Controller). However, this is changing with the emergence of High Speed Downlink Packet Access (HSDPA), where some logic (e.g. retransmission) is handled on the NodeB for lower response times and in 3GPP LTE (a.k.a. E-UTRA) almost all the RNC functionalities have moved to the NodeB.

The utilization of cellular technologies allows cells belonging to the same or different NodeBs and even controlled by different RNC to overlap and still use the same frequency. The effect is utilized in soft handovers.

Since WCDMA and OFDMA often operates at higher frequencies than GSM, the cell range is considerably smaller compared to GSM cells, and, unlike in GSM, the cells' size is not constant (a phenomenon known as "cell breathing"). This requires a larger number of NodeBs and careful planning in 3G (UMTS) networks. Power requirements on NodeBs and UE (user equipment) are much lower.

A NodeB can serve several cells, also called sectors, depending on the configuration and type of antenna. Common configuration include omni cell (360°), 3 sectors (3×120°) or 6 sectors (3 sectors 120° wide overlapping with 3 sectors of different frequency).

High-Speed Packet Access (HSPA) is a collection of mobile telephony protocols that extend and improve the performance of existing UMTS protocols. Two standards HSDPA and HSUPA have been established. High Speed Uplink Packet Access (HSUPA) is a packet-based data service of Universal Mobile Telecommunication Services (UMTS) with typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an Enhanced Dedicated Physical Data Channel (E-DPDCH), implemented on top of the uplink physical data channels such as a Dedicated Physical Control Channel (DPCCH) and a Dedicated Physical Data Channel (DPDCH), thus sharing radio resources, such as power resources, with the uplink physical data channels. The sharing of the radio resources results in inflexibility in radio resource allocation to the physical HSUPA channels and the physical data channels.

The signals from different users within the same cell may interfere with one another. This type of interference is known as the intra-cell interference. In addition, the base station also receives the interference from the users transmitting in neighboring cells. This is known as the inter-cell interference When an orthogonal multiple access scheme such as Single-Carrier Frequency Division Multiple Access (SC-FDMA)—which includes interleaved and localized Frequency Division Multiple Access (FDMA) or Orthogonal Frequency Division Multiple Access (OFDMA)—is used; intra-cell multi-user interference is not present. This is the case for the next generation UMTS enhanced-UTRA (E-UTRA) system—which employs SC-FDMA—as well as IEEE 802.16e also known as Worldwide Interoperability for Microwave Access (WiMAX)—which employs OFDMA. In this case, the fluctuation in the total interference only comes from inter-cell interference and thermal noise which tends to be slower. While fast power control can be utilized, it can be argued that its advantage is minimal.

In the uplink (UL) of OFDMA frequency division multiple access (both classic OFDMA and SC-FDMA) communication systems, it is beneficial to provide orthogonal reference signals (RS), also known as pilot signals, to enable accurate channel estimation and channel quality indicator (CQI) estimation enabling UL channel dependent scheduling, and to enable possible additional features which require channel sounding.

Channel dependent scheduling is widely known to improve throughput and spectral efficiency in a network by having the Node B, also referred to as base station, assign an appropriate modulation and coding scheme for communications from and to a user equipment (UE), also referred to as mobile, depending on channel conditions such as the received signal-to-interference and noise ratio (SINR). In addition to channel dependent time domain scheduling, channel dependent frequency domain scheduling has been shown to provide substantial gains over purely distributed or randomly localized (frequency hopped) scheduling in OFDMA-based systems. To enable channel dependent scheduling, a corresponding CQI measurement should be provided over the bandwidth of interest. This CQI measurement may also be used for link adaptation, interference co-ordination, handover, etc.

One method for forming reference signals is described in US patent application 20070171995, filed Jul. 26, 2007 and entitled "Method and Apparatus for Increasing the Number of Orthogonal Signals Using Block Spreading" and is incorporated by reference herein. The generation of reference signals (RS) sequences can be based on the constant amplitude zero cyclic auto-correlation (CAZAC) sequences, and the use of block spreading for multiplexing RS from multiple UE transmitters is described therein.

SUMMARY OF THE INVENTION

Embodiments of the present invention use dynamically estimated channel delay spreads of mobile users, to assign parameters which define transmissions of reference signals (RS). Exemplary embodiments determine a set of allocated cyclic shift values that are tailored to the channel delay spreads. The set of allocated cyclic shift values are used by a corresponding set of user equipment (UE) being served by a NodeB to form reference signals. Each UE uses the allocated cyclic shift to form its reference signal by applying the cyclic shift to a reference sequence. In some embodiments, the reference sequence is a modulated Constant-Amplitude-Zero-Auto Correlation (CAZAC) sequence. The set of allocated cyclic shift values can be updated periodically to compensate for changes in UEs delay spreads.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
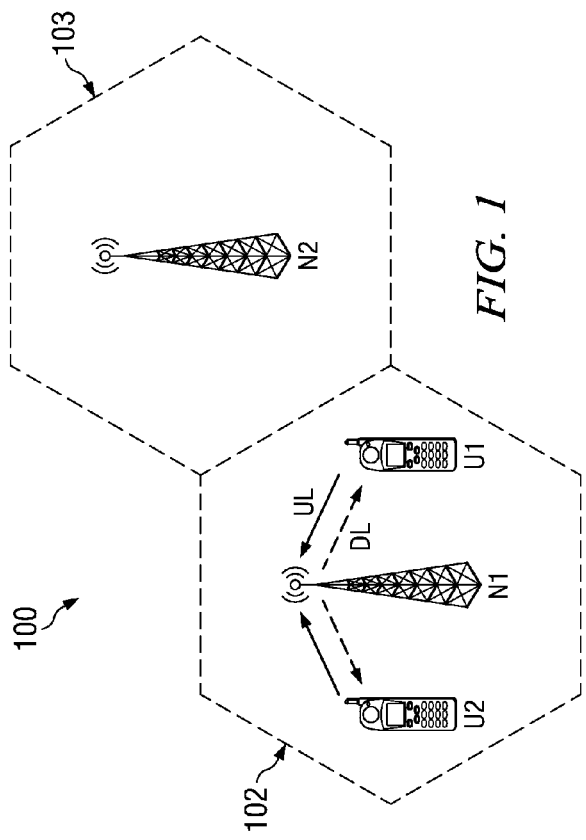
FIG. 1 is a representation of two cells in a cellular communication network that includes an embodiment of adaptive cyclic shifting of references signals.

FIG. 1 is a representation of two cells in a cellular communication network 100 that includes an embodiment of adaptive cyclic shifting of references signals. In this representation only two cells 102-103 are illustrated for simplicity, but it should be understood that the network includes a large matrix of cells and each cell is generally completely surrounded by neighboring cells. A representative set of user equipment U1-U2 is currently in cell 102 and is being served by NodeB N1. Cell 103 is a neighbor cell and NodeB N2 is not serving UE U1-U2. UE U1 and U2 are representative of a set of user equipment in any given cell since there will typically be tens or hundreds of UE in each cell. Each UE communicates with its serving NodeB using an uplink transmission UL and a downlink transmission DL.

As mentioned above, in the uplink (UL) of frequency division multiple access (OFDMA, SC-FDMA, etc) communication systems, it is beneficial to provide orthogonal reference signals (RS), also known as pilot signals, to enable accurate channel estimation and channel quality indicator (CQI) estimation enabling UL channel dependent scheduling.

Figure 2A:
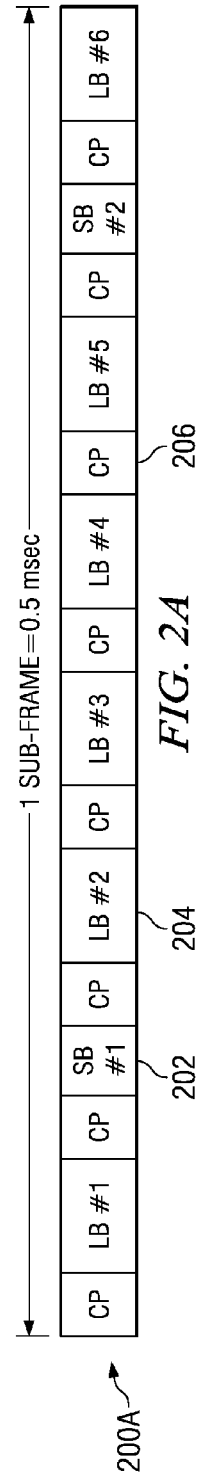
FIGS. 2A and 2B show two exemplary sub-frame structures that include reference signals according to an embodiment of the present invention.
Figure 2B:
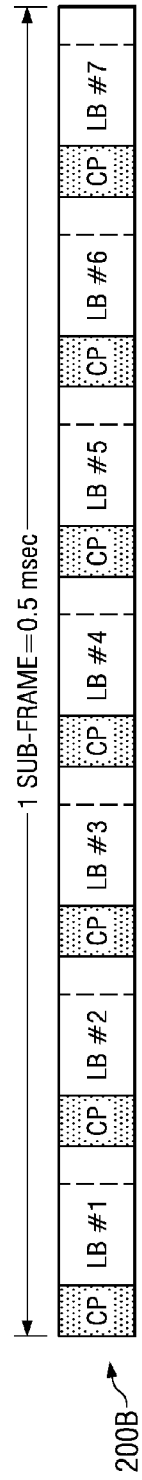

FIGS. 2A and 2B show exemplary sub-frame structures 200A and 200B that includes reference signals, according to an embodiment of the present invention. Exemplary sub-frame structure 200A is one possible sub-frame structure used by a UE for UL transmissions in an OFDMA based system, such as a DFT (Discrete Fourier Transform) spread OFDMA system or a SC-FDMA system. Exemplary sub-frame structure 200B is another possible sub-frame structure used for the same purpose.

Sub-frame 200A comprises of two short blocks (SBs) 202 and six long blocks (LBs) 204 and in the exemplary embodiment it is assumed to have duration of 0.5 milliseconds (msec). All blocks are preceded by a cyclic prefix transmission 206 to protect the corresponding data against the channel delay spread and the respective multi-path propagation. In the exemplary embodiment 200A, data (including control related ones) are assumed to be transmitted in the LBs while reference signals (RS), also referred to as pilots, are assumed to be transmitted in the SBs. Combination of SBs into LBs for the RS transmission may be alternatively applied. The transmission time interval (TTI) of a UE may extend over one or several sub-frames. Sub-frame 200B shows another exemplary embodiment of the 0.5 ms sub-frame structure. In the sub-frame 200B, the RS could be located in any of the symbols, such as for example LB #1, which is the first symbol, or LB #4, which is the middle symbol.

Figure 3:
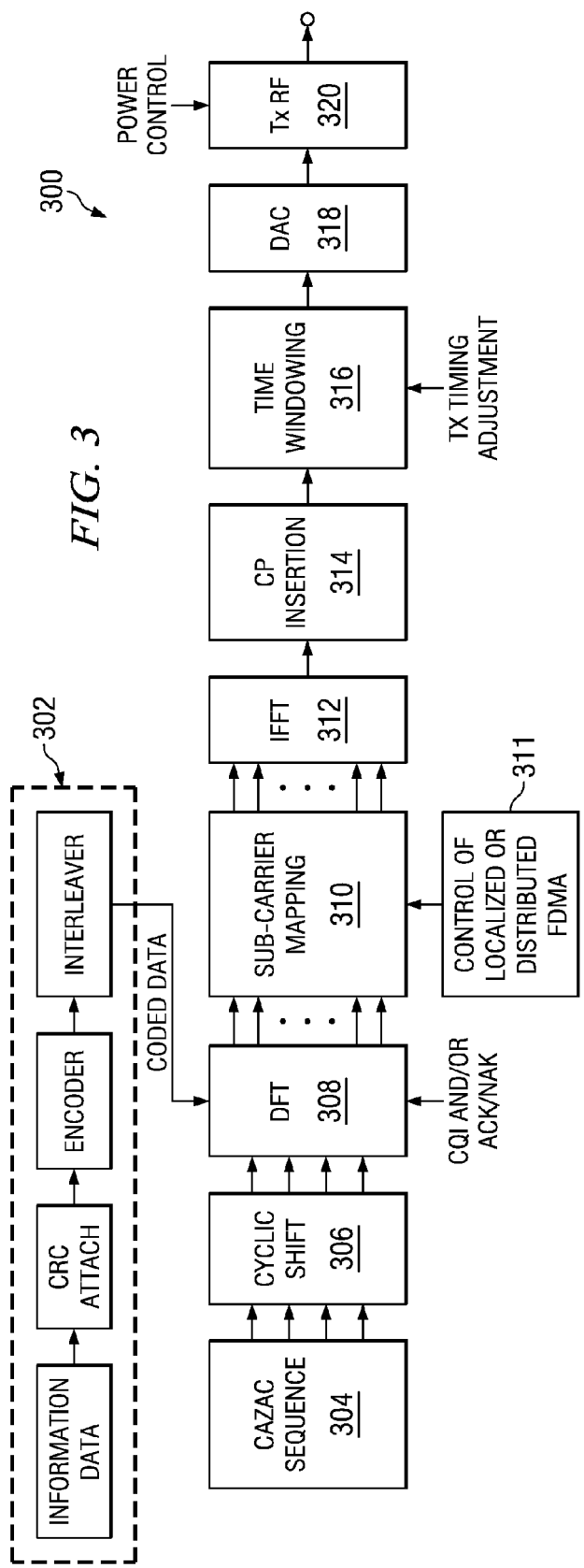
FIG. 3 is a block diagram of an SC-FDMA system for transmitting the sub-frame structures of FIG. 1.

FIG. 3 presents a block diagram for a transmitter 300 in a SC-FDMA system. The information bits, after passing through the coding blocks 302, including an encoder, a CRC attachment and an interleaver, are provided to the modulating unit of the SC-FDMA system. After applying a Discrete Fourier Transform (DFT) 308 on the data, which may also be an ACK/NAK or a CQI related to the downlink (DL) communication, mapping 310 of the DFT output is performed on a selected part of the operating bandwidth (BW). This mapping may be localized, implying that the data sub-carriers occupy a continuous part of the BW, or distributed, implying that the data sub-carriers occupy a discontinuous part of the BW. Subsequently, an Inverse Fast Fourier Transform (IFFT)

Figure 5:
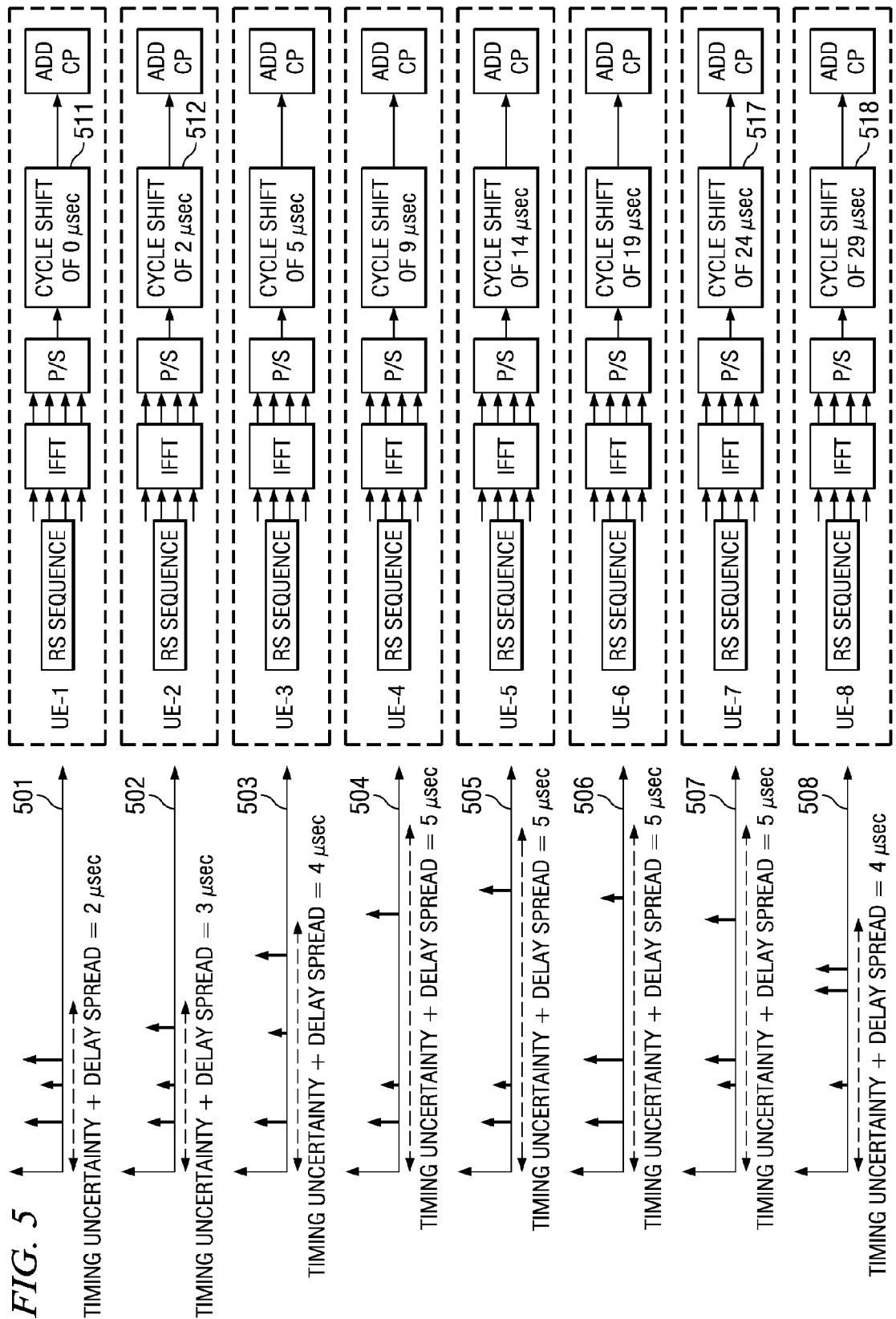
FIG. 5 illustrates exemplary delay spread plots and corresponding adaptive cyclic shift selections for a representative pool of mobile devices.

312 operation is applied, followed by CP insertion 314, time windowing 316 to produce a signal with the desired spectral characteristics, a digital-to-analog converter (DAC) 318, and finally the transmission (Tx) radio frequency (RF) circuitry 320 which includes a power amplifier and the transmitter antenna. In addition the UE may be responsive to Node B signaling indicating a transmit time and/or transmit power adjustment. Similar processing can be applied for the RS which is not modulated signal (carries no information) in order to allow the Node B to perform channel related estimation functions. The RS can be generated from a CAZAC-based sequence 304 and is subsequently cyclically shifted 306 prior to being sent to the DFT 308 for the same functions as for the data transmission to occur thereafter. As the DFT of a predetermined RS-sequence (which can be CAZAC-based sequence) is known in advance, this operation may be omitted, and sub-carrier mapping 310 of the frequency domain representation of the RS-sequence can be performed with the cyclic shift applied after the IFFT 312. This alternate embodiment, where cyclic shift is applied after the IFFT, is shown in FIG. 5.

Figure 4B:
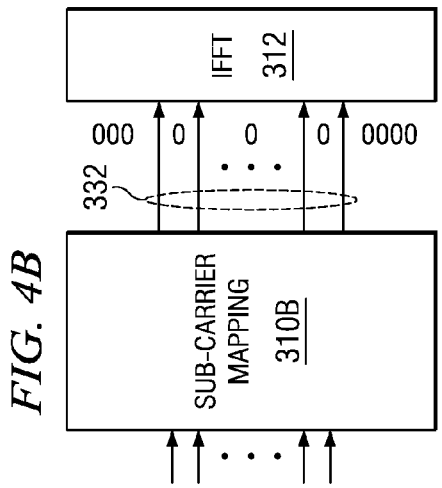
FIGS. 4A and 4B illustrate alternative embodiments of sub-carrier mapping in the system of FIG. 3.
Figure 4A:

FIGS. 4A and 4B illustrate alternative embodiments of sub-carrier mapping in the system of FIG. 3. In FIG. 4A, the mapping 310A is localized as illustrated by the data sub-carriers occupying a continuous part of the BW with zero padding elsewhere. In FIG. 4B the mapping 310B is distributed as illustrated by the data sub-carriers occupying a discontinuous part of the BW with zeros inserted on intervening sub-carrier slots.

Mapping unit 310 produces localized and distributed transmissions in the frequency domain. Control module 311 is responsive to scheduling commands received on the downlink from the serving NodeB and configures mapping unit 310 in response to the received commands. More specifically, the scheduling operation refers to localized signal transmission in contiguous parts of bandwidth (BW), referred to as resource blocks (RBs). In the some embodiments, the RBs assigned to a UE are consecutive, but in general they may be anywhere in the overall scheduling BW. The scheduling BW during a given time period is typically only a part of the total operating BW.

In order for the Node B to obtain a CQI estimate for the UL channel of a UE over the scheduling BW, and thereby perform frequency and/or time domain channel dependent scheduling, the UE needs to transmit a RS over the scheduling BW or over the entire BW (distributed RS). On the other hand, in order to minimize losses from channel estimation, a UE needs to transmit a RS only over the RBs where the UE transmission is scheduled (localized RS) in order to avoid unnecessarily dispersing its transmit power over a wider bandwidth. For this reason, a UE typically transmits a RS, other than the RS associated with data demodulation (DM RS), over a relatively wide bandwidth to enable its serving Node B to obtain a CQI estimate and perform time and/or frequency domain scheduling for the UE over that bandwidth. This RS effectively provides channel sounding over its transmission bandwidth and is referred to as sounding RS (SRS) or CQI RS. As it is typically not the same as the DM RS, it is transmitted during a different a symbol replacing data transmission.

In general, there are two significant limitations in the UL that make frequency dependent scheduling more difficult than in the DL. First, the UEs are transmit power limited which makes accurate CQI estimation challenging, particularly for UEs located near the geographic boundary of the cell and/or whose signals are received at the Node B with low signal-to-interference and noise ratio (SINR). Also, unlike the DL where the CQI estimate may be averaged over several sub-frames, as a RS is transmitted in all sub-frames, in the UL this is only possible if a UE transmits a SRS during consecutive sub-frames, which would result in an unacceptable increase in UL overhead. The overhead associated with the transmission SRSs should be less the resulting scheduling gains in UL throughput. Second, each of multiple UEs devices needs to transmit a separate SRS for CQI measurements, making the efficient multiplexing of such reference signals an important issue.

In the past, the transmission of UE reference signals (RS) is specified independently of a UE's dynamically estimated delay spread. The drawback of such solution is that the reference signal parameters are not tailored to a users dynamically changing delay spreads, and thus, the resources which are assigned to reference signals aren't efficiently utilized. As a result, the selected cyclic shift used by all UEs is typically larger than needed. The consequence of using a large cyclic shift for all UEs is that there are fewer RS sequences (different cyclic shifts thereof) available for allocation to UEs.

In contrast to prior art, embodiments of the present invention dynamically allocates transmission parameters of reference signals, depending on measurements of UEs delay spreads. In exemplary embodiments, the transmission parameters of reference signals are cyclic shifts of reference sequences. Reference sequences can be generated by modifying and modulating CAZAC sequences, which are sequences with good correlation properties.

One construction method for uplink (UL) RS among UEs belonging in a given pool of multiplexed UEs having RS transmission over the same bandwidth, is for each UE to transmit a RS formed by cyclic shift of a Constant-Amplitude-Zero-Auto-Correlation (CAZAC) sequence, such as a Zadoff-Chu sequence. Multiplexed UEs use distinct integer multiples of the same baseline cyclic shift. It is important to note that as the N UEs from the given pool use a common pool of sub-carriers, the only distinction between their RS transmissions is the value of the Cyclic Shift. Thus, the resulting RS signals are said to be orthogonal in the code domain (CDM of the RS). Different cells may use different base CAZAC sequences.

To facilitate the understanding of the invention, FIG. 5 illustrates exemplary delay-spread plots and corresponding adaptive cyclic shift selections for a representative pool of eight mobile devices. FIG. 5 exemplifies a use of the method for adaptively specifying the cyclic shift size allocated for orthogonal RS generation at each UE depending on the channel delay spread and the timing error which is experienced by each of the simultaneously multiplexed UEs.

In typical deployment instances, UEs whose signals experience large delay spreads will be multiplexed with UEs whose signals experience low delay spreads. In such scenarios, cyclic shifts to scheduled UEs for the formation of orthogonal RS can be allocated adaptively, in accordance to the delay spreads of scheduled UEs. The cyclic shift value may also be adapted to the operating environment so that a small cyclic shift value is used in channels with small signal delay spreads, such as channels encountered in indoor environments, while a large cyclic shift value is used otherwise (outdoor environments). Throughout this document, reference to "a scheduled UE during a given time instance" means any UE having an UL signal transmission whether it is just an RS transmission or it includes additional data signals.

For a constant cyclic shift value, a multiple of which being applied to a corresponding multiple of UEs having RS transmission in the same bandwidth, the number of available cyclic shifts equal to the mathematical floor of the ratio of the symbol duration divided by the cyclic shift duration. Therefore, for symbol duration of 33 μsec and cyclic shift duration of 5 μsec, there are a total of 6 available cyclic shifts and the RS from 6 UEs can be orthogonally multiplexed through different cyclic shifts. With adaptive cyclic shift allocation according to the delay spread experienced by each UE, the multiplexing capacity can be increased as more cyclic shifts become available. FIG. 5 describes an example of the proposed adaptive cyclic shift allocation, where 8 orthogonal RS and corresponding UEs are simultaneously supported even though the worst—case delay spread is 5 μsec.

In the embodiment represented by FIG. 5, the time length of a short block is 33 μsec, referring back to SB1 202 of FIG. 2. A CAZAC length is selected to require the same amount of time for transmission. At one given point in time, UE-1 has an estimated delay spread and timing uncertainty 501 of 2 μsec. Similarly, UE-2 has an estimated delay spread and timing uncertainty 501 of 3 μsec, UE-7 has an estimated delay spread and timing uncertainty 507 of 5 μsec, and UE-8 has an estimated delay spread and timing uncertainty 507 of 4 μsec, for example.

In general, if a total of M UEs are to be multiplexed, the cyclic shift allocated to the m-th UE is equal to the sum of the largest (estimated) timing uncertainties and delay spreads of previous m-1 UEs. Thus, UE-1 is allocated the original sequence with no cyclic shifts 511. UE-2 is allocated a cyclic shift 512 which equals the timing uncertainty+delay spread of the first UE, which is 2 μsec, etc. UE-7 is allocated a cyclic shift 517 which equals to the timing uncertainty+delay spread of the first six UEs, and UE-8 is allocated a cyclic shift 518 which equals to the timing uncertainty+delay spread of the first seven UEs. Note that the original sequence length equals the RS duration. For example, if the sequence length is 151 and the RS duration is 33.3 μsec, then the cyclic shift of 1 μsec roughly corresponds to the cyclic shift of ceil (151/33.3)=5 samples. In general, if the sequence length is L and the RS duration is τ μsec, then a cyclic shift of $τ_0$ μsec means a cyclic shift of the sequence by ceil ($L*τ_0/τ$) samples, where "ceil" denotes the mathematical ceiling operation. Other cyclic shifts which are approximately close to ceil ($L*τ_0/τ$) are not precluded [for example round ($L*τ_0/τ$)], where "round" denotes the mathematical rounding operation of a real number to its closest integer. Thus, given a mixture of UEs with high and low delay spreads, the number of supportable UEs with orthogonal RS increases substantially. Table 1 gives a complete example for the representative pool of FIG. 5.

TABLE 1 example allocated shifts at one point in time

| | Timing uncertainty + delay spread | Allocated cyclic shift |
|---|---|---|
| UE-1 | 2 μsec | 0 μsec |
| UE-2 | 3 μsec | 2 μsec |
| UE-3 | 4 μsec | 5 μsec |
| UE-4 | 5 μsec | 9 μsec |
| UE-5 | 5 μsec | 14 μsec |
| UE-6 | 5 μsec | 19 μsec |
| UE-7 | 5 μsec | 24 μsec |
| UE-8 | 4 μsec | 29 μsec |

In this example, if all of the UEs were allocated the same cyclic shift based on a worst case timing uncertainty and delay spread time of 5 μsec, then only six UEs could be included in the pool instead of eight. The same concept can be extended for the case the cyclic shift is adapted to the operating environment where even though a multiple of a base cyclic shift value may be used by a UE, the base cyclic shift value is selected according to the operating environment and is not always the largest one corresponding to the worst operating conditions.

Figure 6:
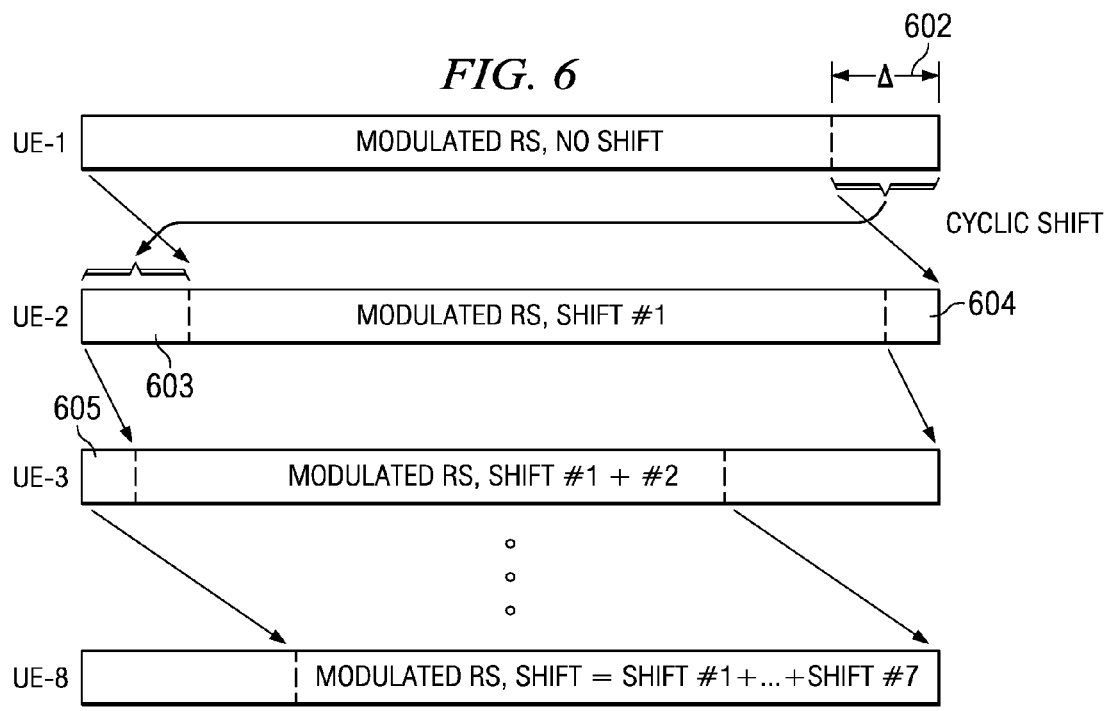
FIG. 6 illustrates adaptive cyclic shift selections of reference signals for four representative mobile devices of FIG. 5 at a different point in time.

FIG. 6 illustrates adaptive cyclic shift selections of reference signals for representative mobile devices of FIG. 5 at a different point in time. Thus, in this embodiment, the allocated cyclic shift is updated periodically. As UEs move around in the cell differences in transmission distance and obstacles will cause the delay spread of each UE to change. Some delay spread will get longer and some will get shorter. For example, in FIG. 6, UE-1 now has a delay spread of 5 μsec which causes an allocated cyclic shift 602-603 in UE-2 to be 5 μsec. UE-2 now has a delay spread of 2 μsec which causes an allocated cyclic shift 604-605 in UE-3 to be 7 μsec, etc. Typically, the sum will always be less than if the worst case amount was assumed for all, therefore more UEs can be supported in each cell.

Some downlink (DL) control signaling will be required to specify the cyclic shift for each UE that is selected based on the actual UE need (delay spread and timing uncertainty) and not always set at a maximum value to support a worst case scenario. The number of bits required to indicate the allocated cyclic shift is very small assuming some quantization of the smallest possible cyclic shift corresponding to a lowest delay spread channel and timing uncertainty and larger cyclic shifts being defined relative to the lowest one. Moreover, the cyclic shift value allocated to each UE varies much slower than the sub-frame or TTI duration, assumed to be in the order of 1 msec, as the delay spread and timing error remain constant over a much longer period. For example, the delay estimation for each UE may be updated at about the same rate as its transmission timing which is in the order of hundreds of milliseconds or even in the order of seconds.

Figure 7:
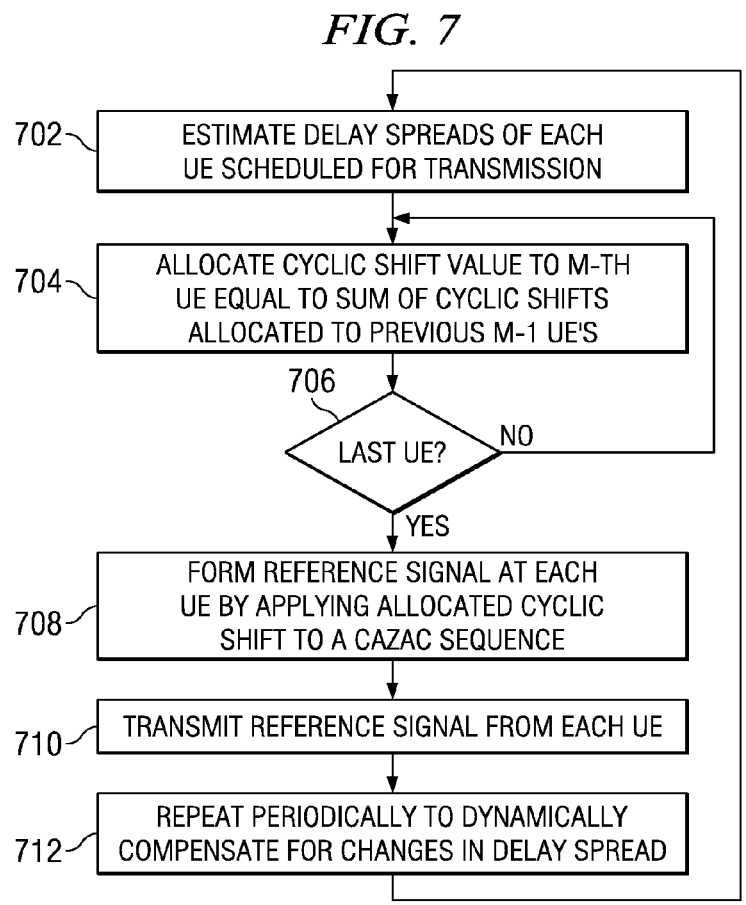
FIG. 7 is a flow chart illustrating adaptive allocation of cyclic shifts.

FIG. 7 is a flow chart illustrating adaptive allocation of cyclic shifts. As described above, an estimate 702 is made by the serving NodeB of the delay spread for each UE in a pool that is scheduled for transmission at a given point in time. This estimation is made by measuring a baseline reference signal from each UE, such as the DM RS or the SRS. The baseline reference signal may be a different reference signal from those used to estimate channel estimation (DM RS) and to estimate the CQI (SRS).

NodeB then allocates 704 a cyclic shift value for to an m-th UE based on a sum of cyclic shifts allocated to previous m-1 UEs of the plurality of UEs scheduled for uplink transmission during the same transmission time interval or sub-frame, where m=[1, total number of UEs scheduled for uplink transmission].

Once all of the UEs in the pool 706 have been allocated a cyclic shift value, then each UE utilizes the allocated cyclic shift to form 708 the transmitted RS by applying a corresponding cyclic shift to the CAZAC sequence, whereby the transmitted RS is orthogonal to each RS transmitted by all others of the plurality of UEs scheduled in the same time transmission period or sub-frame.

Each UE then transmits 710 the RS in the sub-frame according to the transmission schedule.

Periodically 712, each UE transmits another baseline RS and the estimation 702 and allocation 704 process is repeated.

Figure 8:
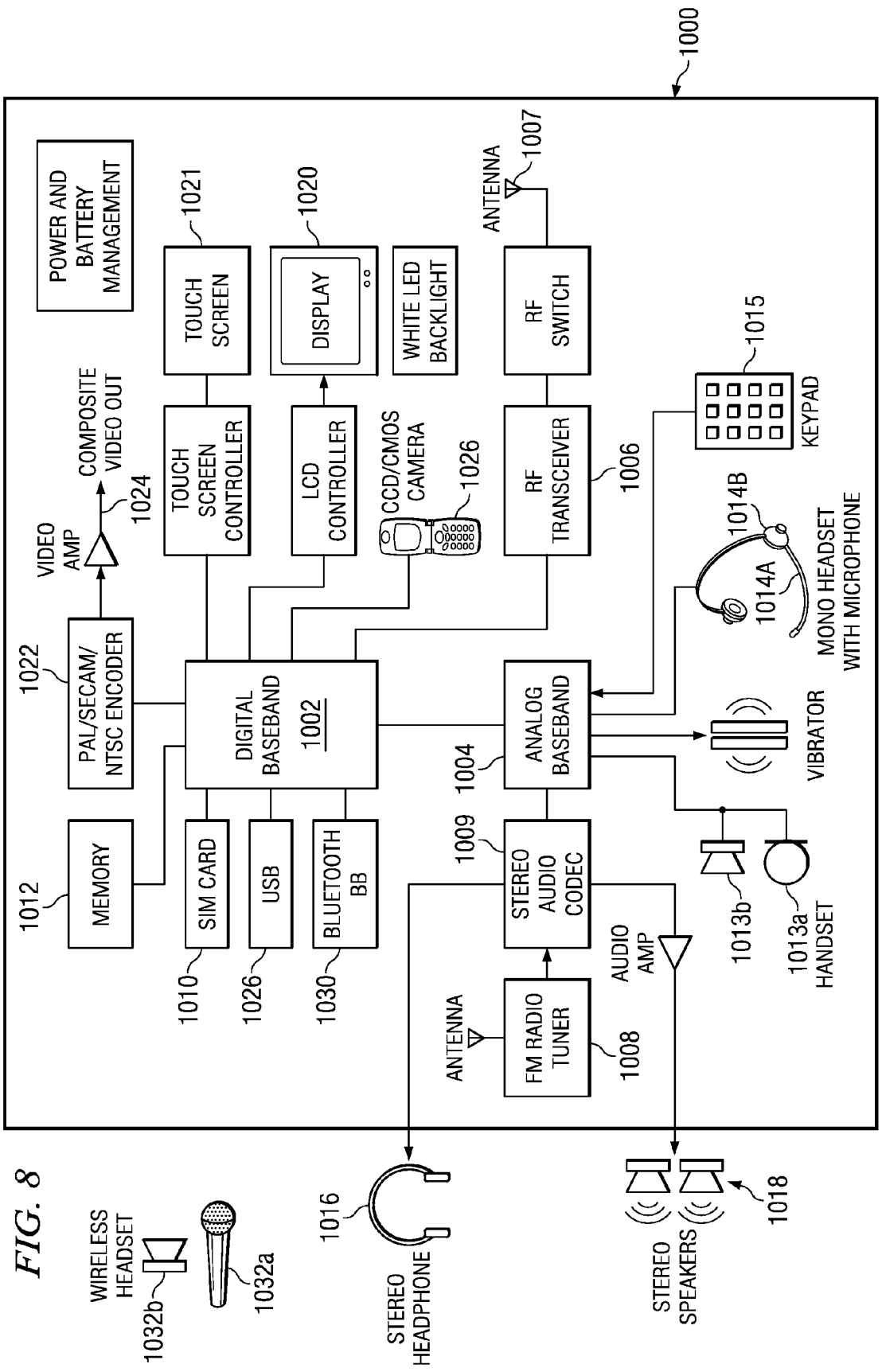
FIG. 8 is a block diagram illustrating a mobile device that uses adaptive cyclic shift selection for reference signals.

FIG. 8 is a block diagram of a UE 1000 with an embodiment adaptive cyclic shift allocation, as described above. Digital system 1000 is a representative cell phone that is used by a mobile user. Digital baseband (DBB) unit 1002 is a digital processing processor system that includes embedded memory and security features. In this embodiment, DBB 1002 is an open media access platform (OMAP™) available from Texas Instruments designed for multimedia applications. Some of the processors in the OMAP family contain a dual-core architecture consisting of both a general-purpose host ARM™ (advanced RISC (reduced instruction set processor) machine) processor and one or more DSP (digital signal processor). The digital signal processor featured is commonly one or another variant of the Texas Instruments TMS320 series of DSPs. The ARM architecture is a 32-bit RISC processor architecture that is widely used in a number of embedded designs.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013a and sends a voice data stream to handset mono speaker 1013b. ABB 1004 also receives a voice data stream from microphone 1014a and sends a voice data stream to mono headset 1014b. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same OMAP processor that performs DBB processing. In another embodiment, a separate DSP or other type of processor performs ABB processing.

RF transceiver 1006 includes a receiver for receiving a stream of coded data frames from a cellular Node B via antenna 1007 and a transmitter for transmitting a stream of coded data frames to the cellular Node B via antenna 1007. A RS is transmitted to nearby Node Bs and configuration commands are received from the serving Node B as described above. Transmission of the RS and scheduled resource block transmissions are configured as described above. In this embodiment, a single transceiver supports SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio includes DFT, subcarrier mapping, and IFFT to form a data stream for transmission and DFT, subcarrier de-mapping and IFFT to recover a data stream from a received signal. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032a and headset 1032b for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. This invention applies to all scheduled communication systems which perform channel sounding across multiple resource blocks. This invention applies in uplink and downlink. Embodiments of this invention are applicable, but not restricted to, frequency division multiplexed (FDM) reference signal transmission for simultaneous transmission from multiple UEs. This includes, but is not restricted to, OFDMA, OFDM, FDMA, DFT-spread OFDM, DFT-spread OFDMA, single-carrier OFDMA (SC-OFDMA), and single-carrier OFDM (SC-OFDM) pilot transmission. The enumerated versions of FDM transmission strategies are not mutually exclusive, since, for example, single-carrier FDMA (SC-FDMA) may be realized using the Discrete Fourier Transform (DFT)-spread OFDM technique. In addition, embodiments of the invention also apply to general single-carrier systems.

A Node B is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

In another embodiment, the cyclic shift allocated to each m-th UE is equal to the sum of a delay spread and a timing uncertainty of each of the previous m-1 UEs plus the delay spread of the m-th UE. The term "delay spread" alone also implies inclusion of timing uncertainties. Multiple antennas of the same UE can be treated as another separate UE, except that delay-spread estimation can be common for all antennas of one UE.

It is therefore contemplated that the appended claims will cover any such modifications of the embodiments as fall within the true scope and spirit of the invention.

What is claimed is:

1. A method for defining transmission parameters of user equipment (UE) reference signals (RS), comprising:
   estimating channel delay spreads of a plurality of UEs scheduled for transmission at a particular transmission time period or sub-frame in an uplink for communication with a NodeB;
   allocating transmission parameters to each scheduled UE of the plurality of UEs in accordance to the delay spreads of the plurality of UEs scheduled for transmission in the particular time period or sub-frame, wherein the parameters comprises a cyclic shift allocated to each m-th UE equal to the sum of a delay spread and a timing uncertainty of each of the previous m-1 UEs, wherein m is equal or greater than 1; and utilizing at the UE the updated allocated cyclic shift to form a later transmitted RS by applying the updated cyclic shift to the CAZAC sequence.

2. The method of claim 1 wherein the parameters are cyclic shifts.

3. The method of claim 1, further comprising using the RS for channel and CQI estimation.

4. The method of claim 3, wherein estimating delay spreads further comprises periodically receiving a baseline reference signal from each of the plurality of UEs at the NodeB for use in estimating the delay spread of the corresponding UE, and wherein the baseline reference signal is different than the RS.

5. The method of claim 1 further comprising sending cyclic shift allocations to the plurality of scheduled UEs from the NodeB using downlink control signaling.

6. The method of claim 2, further comprising determining a base cyclic shift value to provide orthogonal RS multiplexing relative to the UE with the largest delay spread; and wherein the cyclic shift allocated to each m-th UE is an integer multiple of the base cyclic value, wherein m is equal or greater than 1.

7. The method of claim 6, wherein different base cyclic values can be selected in different operating communication environments.

8. A method to adaptively select a cyclic shift applied to a CAZAC sequence for formation of an orthogonal reference signal (RS) transmitted by a user equipment (UE), comprising:

estimating delay spreads of a plurality of UEs scheduled for transmission at a particular transmission time period or sub-frame in an uplink for communication with a NodeB;

allocating a cyclic shift to each scheduled UE of the plurality of UEs in accordance to the delay spreads of the plurality of UEs scheduled for transmission in the particular time period or sub-frame, such that two or more of the UEs are allocated different non-zero cyclic shift values; and receiving a plurality of reference signals from the respective plurality of UEs, wherein each RS comprises a CAZAC sequence that is cyclically shifted by an amount allocated to each respective UE of the plurality of UEs, whereby each received RS is orthogonal to each RS transmitted by all others of the plurality of UEs scheduled in the same time transmission period or sub-frame, wherein the cyclic shift allocated to each m-th UE is equal to the sum of a delay spread and a timing uncertainty of each of the previous m-t UEs, wherein m is equal or greater than 1.

9. The method of claim 8, wherein estimating delay spreads further comprises periodically receiving a baseline reference signal from each of the plurality of UEs at the NodeB for use in estimating the delay spread of the corresponding UE.

10. The method of claim 8, further comprising using each RS for channel and CQI estimation.

11. The method of claim 9, wherein the baseline reference signal is different than the RS.

12. The method of claim 8 further comprising sending cyclic shift allocations to the plurality of scheduled UEs from the NodeB using downlink control signaling.

13. The method of claim 8, further comprising determining a base cyclic shift value to provide orthogonal RS multiplexing relative to the UE with the largest delay spread; and wherein the cyclic shift allocated to each m-th UE is an integer multiple of the base cyclic value, wherein m is equal or greater than 1.

14. The method of claim 13, wherein different base cyclic values can be selected in different operating communication environments.

15. A method to adaptively select a cyclic shift applied to a CAZAC sequence for formation of an orthogonal reference signal (RS) transmitted by a user equipment (UE), comprising:

transmitting a baseline reference signal from the UE to a NodeB that us used to estimate a delay spread during transmission of a sub-frame from the UE;

receiving at the UE a first allocated cyclic shift in accordance to delay spreads of a plurality of UEs scheduled for transmission in the particular time period or sub-frame;

utilizing at the UE the allocated cyclic shift to form the transmitted RS by applying the cyclic shift to the CAZAC sequence;

periodically receiving at the UE an adapted allocated cyclic shift that has a different value in response to dynamic changes to delay spreads of the plurality of UEs scheduled for transmission in a later particular time period or sub-frame, wherein the updated allocated cyclic shift are transmission parameters that comprises a cyclic shift allocated to each m-th UE equal to the sum of a delay spread and a timing uncertainty of each of the previous m-t UEs; and utilizing at the UE the updated allocated cyclic shift to form a later transmitted RS by applying the updated cyclic shift to the CAZAC sequence, wherein m is equal or greater than 1.

16. The method of claim 15, wherein the RS is used for channel and CQI estimation.

17. The method of claim 15 wherein the allocated cyclic shift is received from a serving NodeB using downlink control signaling.

18. A user equipment (UE) comprising:

transmitter circuitry operable to transmit a baseline reference signal from the UE to a NodeB that is used by the NodeB to estimate a delay spread during transmission of a sub-frame from the UE;

receiving circuitry operable to receive a first allocated cyclic shift in accordance to delay spreads of a plurality of UEs scheduled for transmission in a particular time period or sub-frame, wherein the cyclic shift are transmission parameters for each scheduled UE of the plurality of UEs allocated to each m-th UE equal to the sum of a delay spread and a timing uncertainty of each of the previous m-1 UEs, wherein m is equal or greater than 1;

processing circuitry connected to the transmitter circuitry and to the receiver circuitry operable to utilize the allocated cyclic shift to form a reference signal (RS) for transmission by applying the cyclic shift to a CAZAC sequence;

wherein the receiving circuitry periodically receives an updated allocated cyclic shift that has a different value in response to dynamic changes to delay spreads of the plurality of UEs scheduled for transmission in a later particular time period or sub-frame; and wherein the processing circuitry is further operable to utilize the updated allocated cyclic shift to form a later transmitted RS by applying the updated cyclic shift to the CAZAC sequence.

19. A method to adaptively select a cyclic shift applied to a CAZAC sequence for formation of an orthogonal reference signal (RS) transmitted by a user equipment (UE), comprising:
- estimating delay spreads of a plurality of UEs scheduled for transmission at a particular transmission time period or sub-frame in an uplink for communication with a NodeB;
- allocating a cyclic shift to each scheduled UE of the plurality of UEs in accordance to the delay spreads of the plurality of UEs scheduled for transmission in the particular time period or sub-frame, such that two or more of the UEs are allocated different non-zero cyclic shift values, wherein the cyclic shift are transmission parameters for each scheduled UE of the plurality of UEs allocated to each m-th UE equal to sum of a delay spread and a timing uncertainty of each of the previous m-1 UEs, wherein m is equal or greater than 1; and
- utilizing the allocated cyclic shift to form the transmitted RS by applying a corresponding cyclic shift to the CAZAC sequence, whereby the transmitted RS is orthogonal to each RS transmitted by all others of the plurality of UEs scheduled in the same transmission time period or sub-frame.

20. The method of claim 19, wherein estimating delay spreads further comprises periodically transmitting a baseline reference signal from each of the plurality of UEs to the NodeB for use in estimating the delay spread of the corresponding UE.

* * * * *